June 4, 1968     T. W. WALDROP ET AL     3,386,483
FORAGE HARVESTER
Filed July 9, 1965
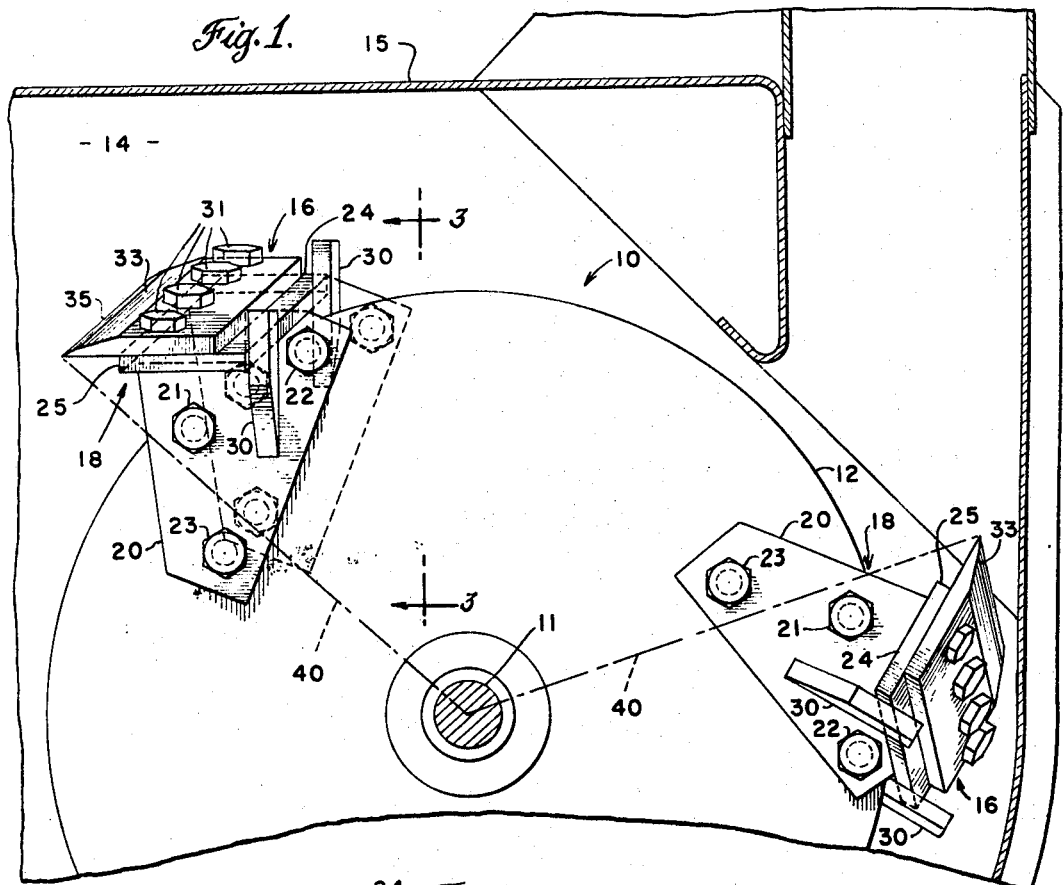
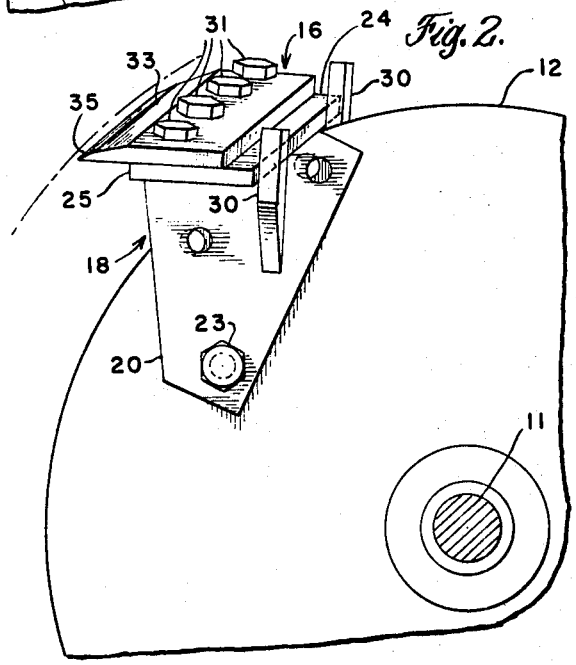
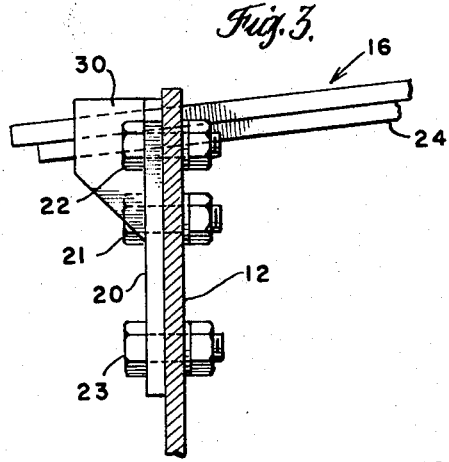
INVENTORS
THOMAS W. WALDROP &
ALLISON W. BLANSHINE
BY *Joseph C. Brown*
ATTORNEY 3,386,483
Patented June 4, 1968

3,386,483
FORAGE HARVESTER
Thomas W. Waldrop, Ronks, and Allison W. Blanshine, Lititz, Pa., assignors to Sperry Rand Corporation, New Holland, Pa., a corporation of Delaware
Filed July 9, 1965, Ser. No. 470,866
4 Claims. (Cl. 146—117)

ABSTRACT OF THE DISCLOSURE

A forage harvester cutter of the reel or cylinder type in which the knife mounting fixtures are connected at each of the end plates by three bolts. The three bolts are arranged so that when a knife strikes an obstacle two of the bolts will shear, and the knife will pivot inwardly on the third bolt.

---

This invention relates to forage harvesters. More particularly the invention relates to a rotary cutter of the reel or cylinder type for a forage harvester.

A forage harvester, of the type to which this invention is particularly applicable, comprises generally a pick-up mechanism for delivering crop material onto an apron conveyor, feed rolls which receive material from the conveyor and deliver it to be chopped, and a cutter unit which functions to comminute the crop material and discharge it a high velocity to a trailing wagon. The forage harvester cutter in performing the chopping function cooperates with a stationary shearbar mounted along the periphery of the housing. Normally, the cutter turns at somewhere between 800 and a 1000 r.p.m. One example of the type of forage harvester referred to is shown in U.S. Patent No. 2,735,469.

It sometimes happens that a rock, rake tine or some other foreign object will find its way into the cutter housing. Various arrangements have been used on prior art machines to prevent damage to the cutter and housing from these foreign objects. It is known, for example, to pivotally mount the cutter knives so that they may pivot rearwardly in the event a foreign object is encountered. A disadvantage with this type of knife mounting is that the cutter knives tend to chatter, and it is difficult to maintain the proper clearance between the knife and shearbar in tough crop material. Shear bolt arrangements are also used in which a shear bolt and a high shear strength bolt are used in the knife mounting. Upon encountering a foreign object, the shear bolt will fail and allow the knife to pivot away from the object. The shear bolt mountings have the disadvantage that special bolts must be provided, and more than one type of mounting bolt must be used. Also, when the shear bolt fails, the knife will in many cases pivot outwardly against thet shearbar or housing, causing substantial damage to the harvester components.

Accordingly, one object of this invention is to provide a forage harvester of the character described with a novel and improved cutter construction.

Another object of this invention is to provide a cutter of the character described with means to protect the cutter knives and forage harvester components in the event a foreign object enters the cutter housing.

Another object of this invention is to provide a cutter of the character described with a fixed knife mounting means so arranged that the knife will pivot radially inward when an obstacle is struck by the knife.

A further object of this invention is to eliminate the necessity for special shear bolts in the knife mounting.

A still further object of this invention is to provide a knife mounting in a cutter of the character described which is easily installed and removed and is rigidly held in place under normal operating conditions.

A still further object of this invention is to provide a cutter of the character described with a simple, inexpensive, and efficient knife mounting.

Other objects of this invention will be apparent hereinafter from the specification and from the recital in the appended claims.

In the drawing:

FIG. 1 is a fragmentary vertical section of a harvester cutter constructed according to this invention and showing two of the cutter knives with their knife mounting fixtures.

FIG. 2 is a fragmentary view of the harvester cutter showing the position of the knife and knife bracket when the outer mounting bolts have sheared, the dot-and-dash arcuate line indicating the normal path of the knife edge prior to any shearing of the bolts.

FIG. 3 is a fragmentary sectional view on the lines 3—3 of FIG. 1.

Referring now to the drawings by numerals of reference and particularly to FIG. 1, 10 denotes a forage harvester cutter having a shaft 11 which rotatably supports the cutter or reel and has end plate means comprising at least two axially spaced end discs, one of which is shown at 12. Carried between discs 12 are a plurality of knife mounting fixtures 18 each of which carries a knife 16. In the drawing, only two knives and their support structure are shown. It is understood, however, that there are three or more knives angularly spaced around the cutter to successively cooperate with a stationary shear bar, not shown. Cutter 10 operates in a housing having top wall 15 and a pair of side walls 14 (only one of which is shown).

Each of the knife mounting fixtures 18 comprises a pair of substantially triangular mounting brackets 20. Each bracket 20 is connected to an end disc 12 and is held thereto by three mounting bolts 21, 22 and 23. A thick flat knife support plate 24 having a substantially rectangular cross section extends across the axially spaced brackets 20 and is affixed to the brackets by welding or other means. Support plate 24 has a flat top side against which knife 16 abuts, an underside parallel to the top side, and axially extending end walls which are perpendicular to the top side and underside. End wall 25 forms the leading edge of support plate 24 as it is rotated in a counterclockwise direction, when viewed as shown in FIG. 1. A pair of vertical elements 30 are affixed to the support plate and to their respective mounting brackets 20. Elements 30 serve to brace the knife mounting fixtures 18 and are adapted to receive set screws (not shown) which bear against the knife 16 to adjustably hold it in place.

Knife 16 is mounted on support plate 24 and is held thereon by bolts 31 which pass through the knife central portion. Knife 16 is formed with a flat underside and a top side having a flat rear portion and a forward tapered section 33 which terminates in knife cutting edge 35. As shown in FIGS. 1 and 2, the tapered forward section 33 projects beyond support plate 24, and the underside of the section forms an angular pocket with end wall 25. Knife 16 is arranged on the cutter with its edge 35 diagonal relative to the cutter axis of rotation to cooperate with a stationary shearbar (not shown) in cutting material processed by the cutter. The knife 16 is so mounted that knife edge 35 is located the same radial distance from the shaft 11 along its axial extent and on rotation of the cutter generates a cylinder.

An important feature of this invention is the manner in which each bracket 20 is mounted on end disc 12. With reference to FIG. 1, it will be seen that bolt 23 is located forwardly in the direction of rotation of a radial line 40 drawn from the cutter axis of rotation to knife edge 35. Further, mounting bolts 21 and 22 are located rearwardly of this line. Each of the mounting bolts 21, 22 and 23 is of the same diameter and of the same shear strength. The bolts are so located on the mounting bracket, however, that when a tangential force is directed against knife edge 35, the resulting shear force is substantially greater against bolts 21, 22, than against bolt 23. The lower shear stress on bolt 23 is due to the forward and radially inward location of the bolt. Thus, when a foreign object is hit by the knife edge, bolts 21 and 22 will shear first and the bracket will tend to pivot inwardly about bolt 23 to the position shown in FIG. 2.

In the operation of the cutter, the knives 16 are rotated at a high r.p.m. and cooperate with a shearbar (not shown) to chop the crop material fed into the chopper unit. In the event that knife 16 should contact a foreign object as it moves past the shearbar, bolts 21 and 22 will shear, allowing the knife mounting fixture to pivot backward on bolt 23 to pass by the object and prevent damage to the knife and shearbar. It has been established through extensive field testing that rarely, if ever, does the knife mounting fixture shear on both sides. Thus, if the two outer bolts are sheared on one side, the mounting bracket on the opposite side tends to keep the fixture from any radial outward movement due to centrifugal force on the fixture. Normally when the two outer bolts shear, the cutter is slowed considerably by the force, and the operator will disengage the drive mechanism before the cutter again picks up speed.

It will be seen from the foregoing description that an efficient means is provided by this invention for protecting the knives and cutter from any material damage in the event a foreign object enters the cutter housing. No special bolts are needed in this arrangement, since the shearing action results from a distribution of stress on the bolts.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A forage harvester cutter comprising a rotatable shaft, coaxial radially extending circular end plate means mounted on said shaft and extending outwardly relative thereto, at least two brackets on said end plate means, said brackets extending radially outwardly of said shaft and being spaced relative to each other in an axial direction relative to the shaft, a support plate generally rectangular in cross section and extending between said brackets and having ends supported thereon, said support plate projecting generally tangentially relative to said end plate means, a flat knife mounted on one flat side of said support plate and coextensive therewith, means connecting said knife to said support plate, said knife having a section projecting outwardly of said support plate and said section having a cutting edge thereon, said support plate having an end wall adjacent said knife section and generally perpendicular to the knife, said wall being inwardly of and behind said cutting edge relative to the direction of travel of said shaft, each of said brackets being generally triangular in shape with the base portion of the triangle being radially outward and the apex portion of said triangle being radially inward, each bracket being connected to said end plate means by three mounting bolts, two of said mounting bolts being located along the outer periphery of said end plate means and the base portion of said triangle and the third mounting bolt being located radially inward therefrom, the shear force on said bolts from a force directed against said knife edge being substantially greater on said two mounting bolts than said third mounting bolt whereby said two mounting bolts will shear when a hard obstacle is struck by said knife and the bracket will pivot radially inwardly about the third bolt.

2. A forage harvester, as recited in claim 1, wherein said third mounting bolt is forward in the direction of rotation of said two mounting bolts and said two mounting bolts are in a line along the outer periphery of said end plate means.

3. A forage harvester cutter comprising a rotatable shaft, end plate means on said shaft, at least one knife mounting fixture on said end plate means, a knife mounted on said fixture having a cutting edge thereon, said knife mounting fixture comprising a bracket on said end plate means and a flat support surface on said bracket for receiving said knife, said bracket being connected to said end plate means by three mounting bolts, two of said bolts being located adjacent the outer periphery of said end plate means the third bolt being located radially inward, said third bolt being forward in the direction of rotation of a radial line from the cutter axis of rotation to said knife edge and said two bolts being rearwardly of said line, the shear stress on said bolts from a tangential force on said edge being substantially greater on said two bolts than said third bolt whereby when said knife hits an obstacle said two bolts will shear allowing said bracket to pivot radially inward away from said obstacle on said third bolt.

4. A forage harvester cutter comprising a housing having a top wall and a pair of side walls, a shaft rotatably supported on said housing walls, a pair of coaxial end plates on said shaft, a plurality of knife mounting fixtures on said end plates, a knife mounted on each of said fixtures, each of said knife mounting fixtures comprising a bracket on each of said end plates and a flat support plate extending between said brackets, said bracket being generally triangular in shape with the base of said triangle being adjacent the outer periphery of said end plate, said bracket being connected to said end plate by two outer mounting bolts along the outer periphery of said bracket and a third mounting bolt radially inward of said two outer mounting bolts, said third mounting bolt being forward of said two mounting bolts in the direction of rotation, and the shear forces on said two mounting bolts being substantially greater than on said third mounting bolt so that when said knife strikes an obstacle said two bolts will shear and the bracket will pivot radially inward about said third bolt.

References Cited

UNITED STATES PATENTS

| | | | |
|---|---|---|---|
| 1,558,502 | 10/1925 | Power | 146—119 X |
| 2,627,156 | 2/1953 | Carter | 56—295 |
| 2,735,469 | 2/1956 | West | 146—117 |
| 3,177,911 | 4/1965 | Probsting | 146—107 |

W. GRAYDON ABERCROMBIE, *Primary Examiner.*